March 5, 1968  F. F. HENSE  3,371,789
COMBINATION LIQUID FILTERING, HEATING AND AERATING DEVICE
Filed June 28, 1965  2 Sheets-Sheet 1
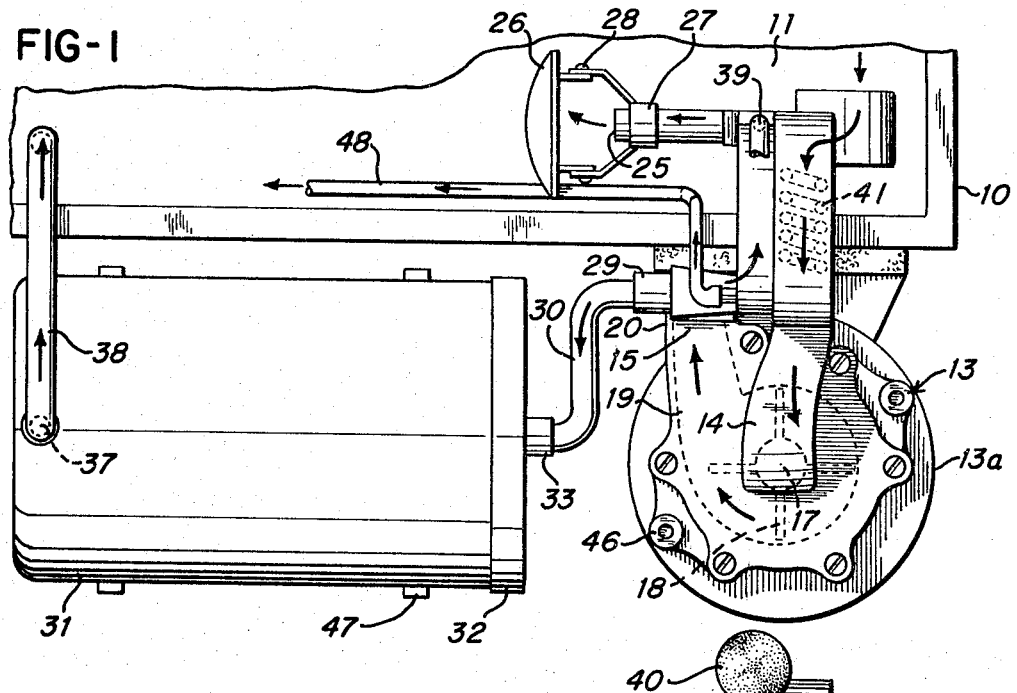
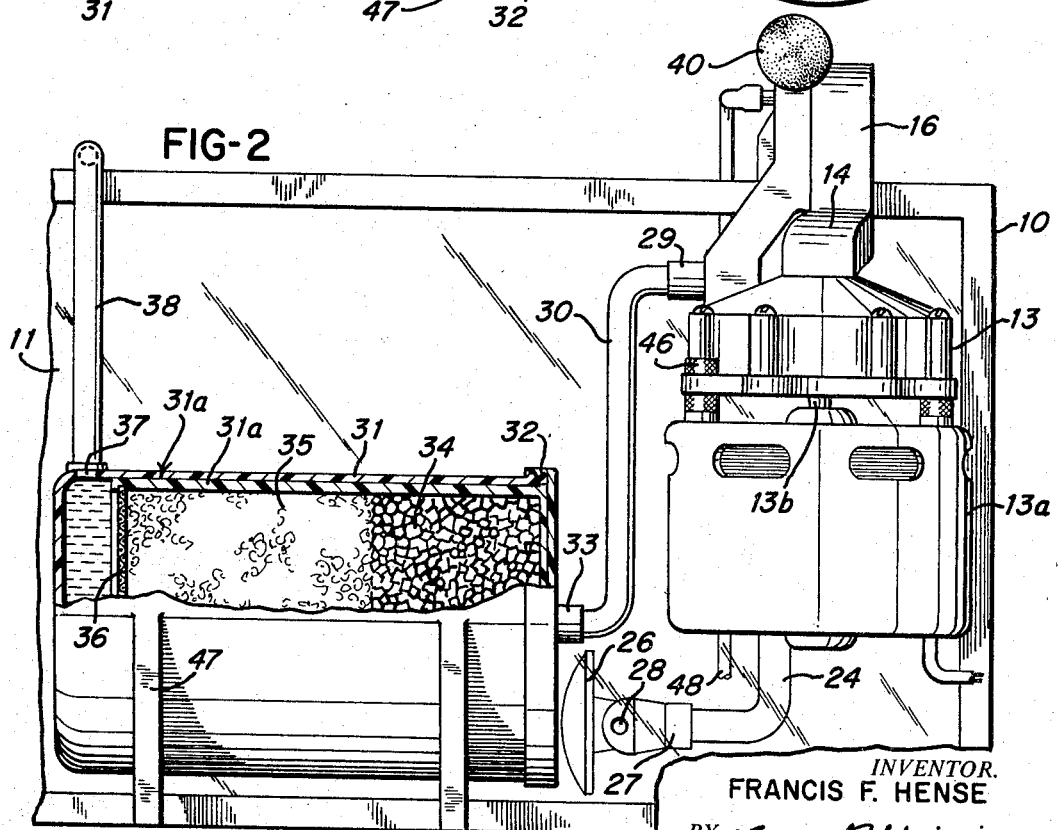
INVENTOR.
FRANCIS F. HENSE
ATTORNEY March 5, 1968 F. F. HENSE 3,371,789
COMBINATION LIQUID FILTERING, HEATING AND AERATING DEVICE
Filed June 28, 1965 2 Sheets-Sheet 2

INVENTOR.
FRANCIS F. HENSE
BY
ATTORNEY

3,371,789
COMBINATION LIQUID FILTERING, HEATING AND AERATING DEVICE
Francis F. Hense, 1429 Wilmington Ave., Apt. 301, Dayton, Ohio 45420
Filed June 28, 1965, Ser. No. 467,671
9 Claims. (Cl. 210—169)

ABSTRACT OF THE DISCLOSURE

A combination filtering and aerating device for an aquatic life-supporting system featuring a pump, the intake conduit of which withdraws liquid from the reservoir and the discharge conduit simultaneously forces water through a separate filter unit from which it returns to the reservoir and through an aerating device before discharging directly into the reservoir. Because of the pumping efficiency thus gained, all of the apparatus may be removed from the reservoir and heated, filtered and aerated water may be recirculated therein with the involvement of only three fluid passages in communication therewith.

---

The present invention relates to a combination unit for filtering, heating and aerating a liquid, and is particularly adaptable for use in connection with reservoirs or receptacles containing water for the maintenance of aquatic life such as is found in aquariums, bait tanks, fish transport vehicles and the like.

Because the sustenance of marine life requires the presence of substantial quantities of air admixed with the water in which it exists as well as the elimination of carbon dioxide and waste from such water, a variety of means for accomplishing these purposes have been necessary adjuncts of fixed receptacles or reservoirs wherein the benefits of the total ecological environment supplied by natural bodies or courses of water are not otherwise available. Prior art devices for artificially aerating the water have included many different bubbling, spraying and agitating expedients which, while they have been capable of supplying the necessary amounts of lifegiving air, have been cumbersome, unsightly, noisy, expensive to build, to operate and to maintain, unreliable and impractical, particularly for the smaller home-type aquariums, in a variety of additional ways. These same objections have been applicable to most if not all of the prior art filtration units which have had the additional disadvantage that the cleaning capacity for a given sized unit has been limited to the extent that adequate cleaning could not in many cases be achieved. A further deficiency of the prior art aerating and filtering devices either as separate units or in combination, has been that the limitations of their design and construction have prevented their being removed from the tank or receptacle containing the water to be treated. This has been particularly undesirable in the case of smaller aquariums where space is limited.

The prior art water heaters, while capable of performing the necessary heating function, have represented one more unit which has had to be inserted in the receptacle, usually to the detriment of its appearance and the ease and convenience of its use. Moreover, these heaters, like the prior art filtration and aeration units have been inefficient in their operation.

It is accordingly an object of the present invention to provide an improved device for aerating, heating and filtering a liquid such as water in a marine life-supporting receptacle or reservoir.

Another object of this invention is to provide a filtering and aerating device of simple construction with a minimum of moving parts which will nonetheless have high filtering and aerating capacity.

Still another object of the invention is to provide such a device which may be inexpensively constructed, installed and maintained and will operate quietly and reliably for long periods of time.

Still another object of the invention is to provide such a device which may be removed completely from the receptacle in which the treated water is stored.

Still another object of the invention is to provide a filtering device which will have maximum filtration capacity.

Yet a more specific object of the invention is to provide an aeration device which will be substantially free of noise in its operation.

Still a more specific object of the present invention is to provide such a device which will be capable of operating auxiliary devices to be used in connection with the aquarium or other receptacle.

To achieve these and other objects and advantages which will appear from a reading of the following disclosure, the present invention contemplates and teaches a novel arrangement of a pump assembly, a filtration chamber and an aeration unit wherein the pressurized discharge of the liquid from the pump is manipulated to cause an unaerated portion of the discharged liquid to flow under pressure through the filtration chamber and into the liquid-containing receptacle or reservoir and the remaining portion of the liquid to be aerated at a selected point in the discharge conduit and to flow directly under pressure into the liquid-containing reservoir or receptacle. To thus manipulate the pressure of the liquid flowing from the pump, the invention teaches a tubular pump discharge conduit containing at least one constriction at a particular point along the length thereof wherein the inside diameter of the fluid passage is constricted and such constricted portion terminates short of the open end of the discharge conduit, the inside diameter of which, downstream from the constricted portion, is accordingly larger than the inside diameter of the constricted portion. This change in diameters within the discharge conduit may result from a tube within a tube or from a divergent wall flaring outwardly from the downstream end of the constructed area.

At a point between the pump and the constricted portion of the discharge conduit there is a gate or an opening to a conduit leading to the filtration unit of such dimensions that a portion of the pump discharge will flow under pressure through such conduit and the filtration unit. At a point at or near the opposite end of such constriction and before the conduit diameter is enlarged, there is associated an air intake stack which, in response to the fluid dynamics of the design, introduces air into the water. Because the constriction may be located at any point along the length of the pump discharge conduit and the water flowing therein may be aerated at any point even up to a point adjacent the discharge opening into the reservoir or receptacle, the present invention makes it possible to pump the water a substantial distance and a substantial height before it becomes aerated with the result that the pumping is more efficient and the thoroughness, degree and preservation of the aeration is not impaired. Because of this, the entire mechanism for accomplishing the pumping, aeration, heating and filtration may be placed outside of and removed from the receptacle or reservoir of the liquid being treated; and this is of particular advantage in the case of display type containers and particularly small aquariums and the like which, instead of being cluttered with the various mechanisms heretofore employed for such purposes, may have only three tubes, hoses or other conduits leading into the same. The three fluid passages thus required are the intake conduit by means of which the water is led from the receptacle into the pump, the pump discharge conduit which discharges the aerated water directly into the receptacle and the conduit leading from the filtering unit to the receptacle.

The pump contemplated by the present invention is of a simple construction comprising a housing and an impeller in the form of a hub from which vanes extend radially to the housing, the hub being rotatably mounted within the housing and affixed to the rotating shaft of an electric motor mounted thereon. Although the pump so constructed is inherently free of substantial noise in operation, the quietness of the unit may be improved by virtue of the fact that the pump may be substantially removed from the aquarium and even placed in a sound-insulated chamber. In a modification of this invention, the silence of operation may be further enhanced by capping the air intake stack which is associated with the pump discharge conduit as indicated above with a porous unit such as a powdered metal or porous ceramic unit, the pores of which are interconnected. It has been discovered that this expedient eliminates the sound that has been characteristic of the flow of air into the aeration devices of the prior art.

In a further modification of the invention, the discharge of the aerated water into the receptacle may be so aimed that the marine life, such as fish for example, can position themselves in the flow of such water and swim against it to be benefited by the exercise that is otherwise unavailable or at least is not induced by conventional aquarium apparatus. On the other hand, where the nature of the marine life or the aquarium itself is such that a lengthy discharge stream is undesirable, a deflector may be affixed to the end of the discharge conduit to dissipate the effect of the pressurized stream and allow the aerated water to rise to the water surface. In yet another modification of the present invention, it has been found that at a point in the pump discharge conduit in the same area wherein the filter by-pass conduit is associated; i.e., someplace between the pump outlet and the constricted area in the discharge conduit or at a second diameter reduction forming a part of the total constriction, one or more additional pressurized liquid take-off conduits may be connected. The pressurized liquid flowing from such auxiliary take-offs may be used to drive other devices that are conventionally associated with aquariums such as animated toys and the like which have conventionally been pneumatically actuated.

The invention thus generally described may be more clearly understood from the following detailed description of certain preferred embodiments thereof in connection with which reference may be had to the appended drawings in which like reference characters refer to like parts and of which:

FIGURE 1 is a plan view of one particular filtration, heating and aeration device according to the present invention associated with an aquarium fragmentarily illustrated.

FIGURE 2 is a front elevation of the device shown in FIGURE 1.

Figure 4:
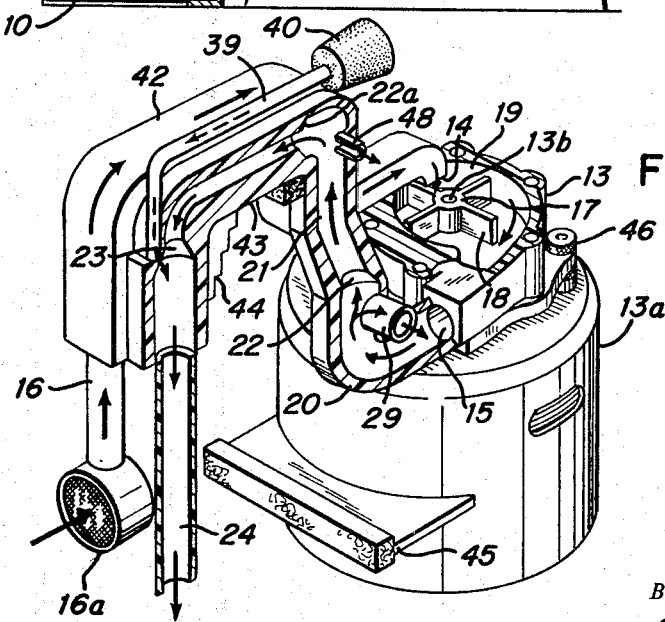
FIGURE 4 is a perspective view, partially broken away and in partial cross section of the pump and fluid circuit and of the aeration unit of the assembly illustrated in FIGURES 1, 2 and 3.

As above stated, the device of the present invention is particularly adaptable for use in connection with a receptacle such as the aquarium 10, the walls of which are usually composed of glass or other transparent material and define a water containing chamber 11 usually open at its top which is customarily filled to a water line 12 which is usually on the order of two or three inches of the open top. Associated with this receptacle is the water pump designated generally by the number 13 which, as best shown in FIGURE 4, comprises the electric motor 13a having a rotatively driven shaft 13b connected to the impeller hub 17 from which extend the radially projecting vanes 18 working against the inner walls of the generally cylindrical or evolutional housing 19 to draw water in through the inlet port 14 and to discharge the same under pressure through the discharge port or opening 15. In the pump housing around the shaft opening is preferably positioned a shaft seal such as an O-ring adjacent the wall of the housing through which the shaft passes.

Figure 3:
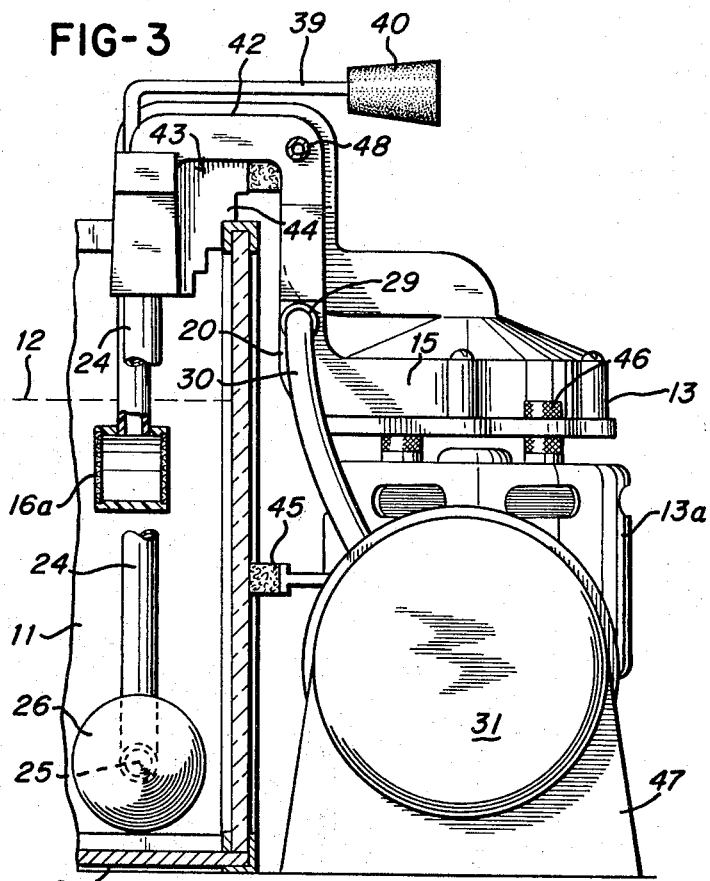
FIGURE 3 is an end elevation of the device illustrated in FIGURES 1 and 2.

As best shown in FIGURES 3 and 4, the water coming into the pump is taken from the water within the chamber 11 by the inlet conduit 16, the aquarium end of which may be provided with a suitable strainer 16a to keep fish or other animal or vegetable life from entering the pump. In like manner, there is associated with the outlet port 15 a pump discharge conduit 20. As is best shown in FIGURE 4, the discharge conduit 20 is characterized by a constricted portion comprising the section 21 of reduced diameter and the successive downstream convergent sections 22 and 22a and a downstream divergent section 23, the latter connecting the constricted portion 21 with the balance of the conduit. All of the water passing beyond first the convergent wall 22 passes through the entire length including the downspout 24 of the conduit to emerge at the tank opening 25 which may, as shown in FIGURES 2 and 3 be positioned relatively near the bottom of the receptacle. Under some circumstances it may be desirable to allow the stream of the flow emitting from the end 25 to project for a substantial length into the water so that fish may exercise by swimming against the stream while at the same time benefiting from the air in the flow within the tank. On other occasions however, it may be desirable to stop or at least to deflect this flow and for that purpose a deflecting cap 26 may be removably and/or adjustably associated with the conduit end 25 by a collar 27 providing a yoke upon which pivotal mountings 28 may be used to affix the cap 26 and to allow the same to be adjusted to deflect the discharge flow upwardly or downwardly.

At a point between the discharge port 15 and the beginning of the constricted area 21 of the conduit as the same may be defined by the first downstream converging portion 22 there is, according to a preferred embodiment of this invention, placed a filter gate or port 29 opening into the discharge passage and having associated in fluid transmitting communication therewith the filter chamber conduit 30 which leads the water on the pressure side of the constricted area 21 from the discharge conduit into a filtering device which may comprise the cylindrical body portion 31 closed at one end and covered at its other by a threadably engaging cap 32 having a hollow cylindrical projection 33 extending therefrom to receive the filter end of the conduit 30 and allow the water therein to enter the filtering chamber. According to conventional filtering practice, the chamber itself may be filled with a purification material such as activated charcoal 34 in lump or powdered form, a glass wool or other fibrous substance 35 to act as a coarse strainer and a mechanical strainer in the form of a sieve or wire mesh 36. In one particular embodiment of such a filter, the charcoal 34, fiberglass 35 and strainer 36 may all be contained within a single removable and replaceable cartridge or shell-like housing 31a, the downstream end of which is open and covered only by the screen 36 and the upstream portion of which is provided with a suitable fitting to cooperate with the filter cap projection 33 to be in fluid transmitting communication with the filter conduit 30. Where such a cartridge is employed, the cap 32 may be unscrewed and the entire cartridge 31a removed for cleaning or replacement without so much as soiling or wetting the hands of the person conducting such operation.

Under the influence of the pressure provided by the pump in response to the electrically driven movement of the vanes 18 in the housing 19 thereof the water is of course supplied to the discharge conduit 20 under pressure. Beyond this, the fluid dynamics effect of the constricted portion of this passage is such that the water tends to build up at the beginning of the convergent wall 22 with the result that all of the fluid between this wall and the discharge orifice 15 is under even greater pressure; and it is this pressure which causes the fluid to course through the filter passage 30, the filtering materials 34 and 35 and the screen 36 and to emerge from the filter at the opening 37 and to re-enter the receptacle via the filter discharge tube 38.

At the end of the constricted portion of the discharge conduit 20 opposite the end nearest the pump discharge and beyond the second convergent wall section 22a where there is such a second section, there is connected the air intake stack 39 one end of which opens into the discharge conduit at the downstream divergent wall portion 23 and the other end of which is vented to the atmosphere and, in the case of the preferred embodiment shown, is capped by the porous "air stone" 40. This porous member as explained above may be any stereoreticulate substance such as powdered metal, blown silica, or the like, through which the air entering the stack 39 may pass and be diffused into myriad small channels, the effect of which is to silence the rushing sound that is usually associated with air moving quickly into a restricted area.

In operation, the effect of the pressurized take-off of the filter conduit 30 from the point at which the pressure within the discharge conduit 20 is at a high point is such that the fluid is forced under pressure through the filtering media as a result of which a greater volume of the liquid is caused to pass through the filter in a given period of time than has been the case in the prior art devices which have relied usually upon gravitational flow or an air-motivated water movement to accomplish filtering. Even beyond the point at which the filter conduit departs from the main discharge conduit however, the balance of the water in the discharge conduit remains under substantial pressure and free of such aeration as would interfere with pumping efficiency and fluid flow until it reaches the point at which the demand for efficiency is reduced, as for example after the conduit has actually passed over the edge of the vertical wall of the receptacle 10 at which point the constricted portion 21 may be enlarged by the divergent wall section 23 to the original inside diameter of the conduit and at which point the air intake may be associated. The fluid dynamics effect of this relatively rapid expansion of the inside diameter of the conduit is to cause a release of pressure of the fluid and to pull in air from the atmosphere through the porous cap 40 and the air intake stack 39 while the water, in further response to the reduction in pressure, is moving rapidly and will receive the air in a relatively permanent solution therein so that it remains in the water as it emerges from the discharge opening 25 and flows into the aquarium.

Since it is often desired to heat the water in aquariums and similar receptacles, an important adjunct of the present invention is the combination with the aerating unit thereof of a heating unit which, as illustrated in FIGURE 1, may comprise an electrically energized and resistance heated coil 41 embedded in the wall of at least a part of the above described fluid passages. In specific combination with the structure and parts of this invention however, improved aeration may be obtained by positioning the heater upstream from the air intake so the water is heated prior to and at the time it is aerated. This, along with the fact that improved heat transfer occurs where the water flowing along the heater is travelling at a relatively low speed, makes the pump intake conduit or any part thereof a particularly desirable location for the heater coil 41, the electrical energization and resultant heat output of which may be controlled by known expedients.

While, as above indicated, the performance capabilities of the parts of the invention are such that any or all of them may be placed in, around or substantially separated from the receptacle or reservoir of the fluid being treated, one convenient arrangement is shown to comprise shaping the pump intake and discharge conduits into a hook-like arrangement 42 providing a lip 43 which can be hung over the top edge of the receptacle walls. As best shown in FIGURE 3, the interior of this lip portion may be provided with a step-like width reducing web 44 so that a variety of receptacle wall thicknesses can be accommodated. Cooperating with the hook arrangement is the base support 45 which projects laterally from the motor mounted to and depending from the pump to bear against the side of the receptacle wall and hold the assembly so that the underwater portions at least of the various fluid conduits are substantially vertical while the pump housing is substantially horizontal. In this position, the pump housing acts as the second portion of the mounting bracket providing a horizontal platform to which the electric motor may be affixed as by way of the threaded fasteners 46 and from which it may depend as illustrated. While the filter unit 31 may be similarly provided with a hook-like member for hanging over the upper edge of the receptacle wall, it is shown in the preferred embodiment illustrated to rest in a cradling base 47 which itself rests upon the table or other supporting surface upon which the receptacle stands.

Where they are properly sealed against the water by means well known in the art, all of the components of this invention may be submerged in the receptacle or reservoir of the liquid being treated. While this is often satisfactory in the case of larger ponds or bodies of water which are not intended primarily for purposes of display, the present invention has particular utility in filtering, heating and aerating water in connection with relatively small display tanks such as household aquariums and the like. Moreover, the removal of all of the filtering, heating and aerating apparatus from even the near vicinity of the chamber itself allows for a greater simulation of natural conditions and elimination of all mechanical noises from the environs of the marine life as the result of which it may prosper more abundantly.

In certain instances a part of this simulated environment may include various mechanical devices such as windmills or animated toys which have traditionally been operated by pneumatic means. The efficiencies of this invention may be utilized for this auxiliary operation however by making such devices water powered and associating them with an additional power take-off tube such as 48 from the pressure side of the discharge conduit. To obtain maximum fluid pressure, such an auxiliary powered take-off conduit 48 is preferably positioned between the discharge orifice of the pump and the downstream terminus of the restricted portion 21. As best illustrated in FIGURE 4, one preferred means for associating such a power take-off with the discharge conduit comprises positioning the power take-off tube adjacent a second converging wall portion 22a which further reduces the inside diameter of the constricted portion of the conduit between the filter conduit gate 29 and the air intake stack 39. As a result of the second reduction in the diameter of the conduit at the point the power take-off tube is thus connected, the fluid pressure adjacent the upstream end of the converging wall 22a is at a high point and can supply maximum power for operating the auxiliary equipment.

While the within invention has been described in considerable detail in connection with certain preferred embodiments thereof, it is to be understood that the foregoing particularization has been for the purpose of illustration only and does not limit the scope of the invention as it is defined in the subjoined claims.

I claim:

1. A combination liquid filtering and aerating device comprising a pump having intake and output openings for circulating an aquatic life-supporting liquid in a reservoir thereof, an intake conduit interconnecting said intake opening and said reservoir a discharge conduit interconnecting said output opening and said reservoir and characterized by a constricted portion of reduced inside diameter thereof, by-pass means for withdrawing liquid from said discharge conduit between the said output opening and said constricted portion, said by-pass means being connected to a filtration chamber, an air intake stack vented to the atmosphere at one open end and affixed at its other end to said discharge conduit at the end of said constricted portion opposite that end which is nearer said by-pass means, and a filter output conduit for returning the liquid from said filtration chamber to said reservoir.

2. A device according to claim 1 wherein said constricted portion comprises at least one convergent wall section, an intermediate portion of reduced diameter and a divergent wall section successively downstream of the discharge conduit.

3. A device according to claim 2 wherein said by-pass means are connected to said discharge conduit at said convergent wall section.

4. A device according to claim 3 wherein said air intake stack is associated with said discharge conduit at said divergent wall section.

5. A device according to claim 1 wherein a microporous cap is affixed to said air intake stack at the end thereof vented to the atmosphere.

6. A device according to claim 1 wherein an adjustable deflector is affixed to and spaced from the downstream end of said discharge conduit.

7. A device according to claim 1 wherein heating means are associated with said liquid intake conduit near said intake opening.

8. A device according to claim 7 wherein said heating means comprise an electrically energized heating coil coextensive with at least part of the wall of said intake conduit.

9. A device according to claim 1 wherein an auxiliary pressurized liquid take-off for operating water-powered accessories is connected to said discharge conduit between said output opening and its connection to said air intake stack.

References Cited

UNITED STATES PATENTS

| | | | |
|---|---|---|---|
| 950,999 | 3/1910 | Erlwein et al. | 210—169 X |
| 2,672,845 | 3/1954 | Schneithorst | 210—169 X |
| 3,291,309 | 12/1966 | Hutchison | 210—195 X |

FOREIGN PATENTS 30,332    8/1964    Germany.

SAMIH N. ZAHARNA, *Primary Examiner.*

F. MEDLEY, *Assistant Examiner.*